United States Patent
Fujimaki

(10) Patent No.: US 10,227,038 B2
(45) Date of Patent: Mar. 12, 2019

(54) REGULATION SPEED DISPLAY APPARATUS OF VEHICLE

(71) Applicant: TOYOTA JIDOSHA KABUSHIKI KAISHA, Toyota-shi (JP)

(72) Inventor: Yusuke Fujimaki, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 292 days.

(21) Appl. No.: 15/092,042

(22) Filed: Apr. 6, 2016

(65) Prior Publication Data

US 2016/0332566 A1    Nov. 17, 2016

(30) Foreign Application Priority Data

May 11, 2015 (JP) .................. 2015-096784

(51) Int. Cl.
*G06K 9/00* (2006.01)
*B60Q 9/00* (2006.01)

(52) U.S. Cl.
CPC ............ *B60Q 9/00* (2013.01); *G06K 9/00818* (2013.01)

(58) Field of Classification Search
CPC ......... B60Q 9/00; B60R 1/00; G06K 9/00818
USPC ........................................................ 348/148
See application file for complete search history.

(56) References Cited

U.S. PATENT DOCUMENTS

| | | | |
|---|---|---|---|
| 6,681,195 B1 * | 1/2004 | Poland | G01P 3/38 700/159 |
| 8,576,285 B2 * | 11/2013 | Gomi | B60R 1/00 348/113 |
| 2010/0188288 A1 * | 7/2010 | Bahlmann | B60W 30/146 342/357.23 |
| 2010/0283855 A1 * | 11/2010 | Becker | G06K 9/00818 348/148 |
| 2010/0302361 A1 | 12/2010 | Yoneyama et al. | |
| 2012/0046855 A1 | 2/2012 | Wey et al. | |
| 2013/0271292 A1 * | 10/2013 | McDermott | G08G 1/096783 340/905 |
| 2014/0327772 A1 * | 11/2014 | Sahba | G06K 9/00818 348/148 |

(Continued)

FOREIGN PATENT DOCUMENTS

| | | |
|---|---|---|
| DE | 10 2010 039 634 A1 | 2/2012 |
| EP | 2 026 313 B1 | 2/2011 |

(Continued)

*Primary Examiner* — Reza Aghevli
(74) *Attorney, Agent, or Firm* — Oblon, McClelland, Maier & Neustadt, L.L.P.

(57) ABSTRACT

The invention relates to a regulation speed display apparatus of a vehicle. The apparatus causes a display device to display a detected regulation speed as a standard regulation speed when a traffic sign in a shot landscape is not a traffic sign with an auxiliary sign. The apparatus causes the display device to display the detected regulation speed as the standard regulation speed when the traffic sign in the shot landscape is the traffic sign with the auxiliary sign and the detected regulation speed is larger than an already displayed standard regulation speed. The apparatus causes the display device to maintain the display of the already displayed standard regulation speed when the traffic sign in the shot landscape is the traffic sign with the auxiliary sign and the detected regulation speed is equal to or smaller than the already displayed standard regulation speed.

4 Claims, 9 Drawing Sheets

(56) References Cited

U.S. PATENT DOCUMENTS

| | | | |
|---|---|---|---|
| 2014/0362221 A1* | 12/2014 | Schofield | G06K 9/00818 348/148 |
| 2016/0117562 A1* | 4/2016 | Chung | G06K 9/00818 382/104 |
| 2016/0275792 A1* | 9/2016 | Takiguchi | G08G 1/09623 |
| 2017/0017851 A1* | 1/2017 | Matsui | G01C 21/36 |

FOREIGN PATENT DOCUMENTS

| | | |
|---|---|---|
| JP | 2010-205160 | 9/2010 |
| JP | 2010-282278 | 12/2010 |

* cited by examiner

REGULATION SPEED DISPLAY APPARATUS OF VEHICLE

BACKGROUND OF THE INVENTION

Field of the Invention

The present invention relates to a regulation speed display apparatus of a vehicle for displaying a regulation speed indicated in a traffic sign with respect to a driver and/or passengers of the vehicle.

Description of the Related Art

Traffic signs (or road signs) are set up by the side of a road for indicating information on a regulation speed applied to a vehicle travelling on the road. A regulation speed display apparatus of a vehicle is described in JP 2010-205160 A. The regulation speed display apparatus displays a regulation speed indicated in the traffic sign. This regulation speed display apparatus recognizes a traffic sign appearing in an image of the landscape shot by a camera installed in the vehicle on the basis of data of the image and displays the recognized traffic sign in a display provided at a position which a driver of the vehicle can see.

Further, as the traffic sign, there is a traffic sign with a plate (i.e., an auxiliary sign) indicating a condition for applying the regulation speed to the vehicle. The condition relates, for example, to the weather, a type of the vehicle, a time zone and the like.

In addition, a traffic sign recognition apparatus is described in JP 2010-282278 A. This traffic sign recognition apparatus determines whether or not the regulation speed indicated in the traffic sign with the auxiliary sign should be applied to the vehicle.

SUMMARY OF THE INVENTION

For example, in many cases, in case that set up by the side of the road is the traffic sign with the auxiliary sign indicating a regulation speed to be applied to the vehicle when it snows, set up by the side of the road is a traffic sign indicating a regulation speed to be applied to the vehicle when it does not snow. In other words, in almost all the cases, a normal traffic sign with no auxiliary sign (hereinafter, will be referred to as "the standard traffic sign") is set up by the side of the road set up with the traffic sign with the auxiliary sign. In general, the regulation speed indicated in the traffic sign with the auxiliary sign is smaller than the regulation speed indicated in the standard traffic sign.

In addition, when the regulation speed display apparatus fails to detect the standard traffic sign due to any causes such as the fact that the standard traffic sign is behind the other vehicle, the regulation speed display apparatus may display a regulation speed considerably smaller than a regulation speed to be essentially applied to the own vehicle. Further, the auxiliary sign is generally small and letters are often indicated in the auxiliary sign. Therefore, even when the regulation speed display apparatus has detected the traffic sign with the auxiliary sign, the regulation speed display apparatus may not detect a content of the condition (i.e., an application condition) indicated in the auxiliary sign.

In consideration of the fact described above, when the detected regulation speed is larger than the regulation speed already displayed in the regulation speed display apparatus upon the detection of the regulation speed indicated in the traffic sign with the auxiliary sign, a regulation speed near the regulation speed to be essentially applied can be displayed in the regulation speed display apparatus with high possibility although the detected regulation speed is smaller than the regulation speed to be essentially applied. Therefore, it is preferred to cause the regulation speed display apparatus to display the detected regulation speed.

In addition, in some countries, letters indicating a place name or the like, but not indicating the application condition of the regulation speed may be indicated in a plate having the same shape as the shape of the auxiliary sign. The traffic sign with such a plate may be recognized as the traffic sign with the auxiliary sign. In this case, if the regulation speed indicated in the traffic sign with that plate is not employed as a candidate of the regulation speed to be displayed in the regulation speed display apparatus, the exact regulation speed is unlikely to be displayed.

The present invention has been made for addressing the problem described above. One of objects of the present invention is to provide a regulation speed display apparatus of a vehicle which is likely to display a regulation speed to be essentially applied to the vehicle or a regulation speed near the regulation speed to be essentially applied even when the displayed regulation speed is smaller than the regulation speed to be essentially applied.

The regulation speed display apparatus of the vehicle according to the present invention (hereinafter, will be referred to as "the invention apparatus") comprises:

a display device (13) for displaying a regulation speed to be applied to the vehicle (30);

an image acquisition device for shooting a landscape in front of the vehicle (30) to acquire image data of the landscape in front of the vehicle (30); and a processing section (12) for detecting a regulation speed indicated in a traffic sign appearing in the shot landscape on the basis of the image data and causing the display device (13) to display the detected regulation speed as a standard regulation speed (Vst).

The processing section (12) is configured to determine whether or not a traffic sign appearing in the shot landscape and indicating a regulation speed newly detected by the processing speed (12) is a traffic sign (52) with an auxiliary sign (52a) on the basis of the image data.

The processing section (12) is configured to cause the display device (13) to display the newly detected regulation speed as the standard regulation speed (Vst) when the processing section (12) determines that the traffic sign appearing in the shot landscape and indicating the newly detected regulation speed is not the traffic sign (52) with the auxiliary sign (52a).

Thereby, the regulation speed indicated in the traffic sign other than the traffic sign with the auxiliary sign, that is, indicated in a standard traffic sign is displayed as the standard regulation speed in the display device.

Further, the processing section (12) is configured to cause the display device (13) to display the newly detected regulation speed as the standard regulation speed (Vst) when the processing section (12) determines that the traffic sign appearing in the shot landscape and indicating the newly detected regulation speed is the traffic sign (52) with the auxiliary sign (52a) and the newly detected regulation speed is larger than the regulation speed already displayed as the standard regulation speed (Vst) in the display device (13).

Thereby, the regulation speed display apparatus is likely to display a regulation speed to be essentially applied to the vehicle as the standard regulation speed or display a speed near the regulation speed to be essentially applied to the vehicle as the standard regulation speed even though the displayed regulation speed is smaller than the regulation speed to be essentially applied to the vehicle.

On the other hand, the processing section (12) is configured to maintain the present display of the regulation speed as the standard regulation speed (Vst) in the display device (13) without causing the display device (13) to display the newly detected regulation speed as the standard regulation speed (Vst) when the processing section (12) determines that the traffic sign appearing in the shot landscape and indicating the newly detected regulation speed is the traffic sign (52) with the auxiliary sign (52a) and the newly detected regulation speed is equal to or smaller than the regulation speed already displayed as the standard regulation speed (Vst) in the display device (13).

When the regulation speed indicated in the traffic sign with the auxiliary sign is equal to or smaller than the regulation speed already displayed as the standard regulation speed in the display device, it cannot be determined whether the regulation speed indicated in the traffic sign with the auxiliary sign or the regulation speed displayed as the standard regulation speed in the display device is near the regulation speed to be essentially applied to the vehicle. Therefore, it is possible to prevent a regulation speed which may not be near the regulation speed to be essentially applied from being displayed in the display device by preventing the newly detected regulation speed from being displayed in the display device when the newly detected regulation speed indicated in the traffic sign with the auxiliary sign is equal to or smaller than the regulation speed already displayed as the standard regulation speed in the display device.

In case that the display device (13) is configured to display an auxiliary regulation speed (Vsub) in addition to the standard regulation speed (Vst), the processing section (12) may be configured to cause the display device (13) to display the newly detected regulation speed as the auxiliary regulation speed (Vsub) when the processing section (12) determines that the traffic sign appearing in the shot landscape and indicating the newly detected regulation speed is the traffic sign (52) with the auxiliary sign (52a) and the newly detected regulation speed is equal to or smaller than the regulation speed already displayed as the auxiliary regulation speed (Vsub) in the display device (13).

Thereby, when the newly detected regulation speed indicated in the traffic sign with the auxiliary sign is equal to or smaller than the regulation speed already displayed as the auxiliary regulation speed in the display device, the newly detected regulation speed is displayed as the auxiliary regulation speed in the display device.

Alternatively, when the display device (13) is configured to display the auxiliary regulation speed (Vsub) in addition to the standard regulation speed (Vst), the processing section (12) may be configured to cause the display device (13) to display the newly detected regulation speed as the auxiliary regulation speed (Vsub), independently of whether or not the newly detected regulation speed is equal to or smaller than the regulation speed already displayed as the auxiliary regulation speed (Vsub) in the display device (13) when the processing section (12) determines that the traffic sign appearing in the shot landscape and indicating the newly detected regulation speed is the traffic sign (52) with the auxiliary sign (52a) and the processing section (12) recognizes a content indicated in the auxiliary sign (52a).

Thereby, when the content indicated in the auxiliary sign is recognized, the newly detected regulation speed is displayed as the auxiliary regulation speed in the display device.

On the other hand, the processing section (12) may be configured to cause the display device (13) to display the newly detected regulation speed as the auxiliary regulation speed (Vsub) when the processing section (12) determines that the traffic sign appearing in the shot landscape and indicating the newly detected regulation speed is the traffic sign (52) with the auxiliary sign (52a), the processing section (12) does not recognize a content indicated in the auxiliary sign (52a) and the newly detected regulation speed is equal to or smaller than the regulation speed already displayed as the auxiliary regulation speed (Vsub) in the display device (13).

Thereby, when the content indicated in the auxiliary sign is not recognized and the newly detected regulation speed indicated in the traffic sign with the auxiliary sign is equal to or smaller than the regulation speed already displayed as the auxiliary regulation speed in the display device, the newly detected regulation speed is displayed in the display device.

In addition, the processing section (12) may be configured to cause the display device (13) to display the newly detected regulation speed when the processing section (12) determines that the traffic sign appearing in the shot landscape and indicating the newly detected regulation speed is the traffic sign (52) with the auxiliary sign (52a) and the display device (13) has displayed no regulation speed as the auxiliary regulation speed (Vsub).

Thereby, when no regulation speed has been displayed as the auxiliary regulation speed in the display device, the newly detected regulation speed indicated in the traffic sign with the auxiliary sign is displayed as the auxiliary regulation speed in the display device.

In the above description, for facilitating understanding of the present invention, elements of the present invention corresponding to elements of an embodiment described later are denoted by reference symbols used in the description of the embodiment accompanied with parentheses. However, the elements of the present invention are not limited to the elements of the embodiment defined by the reference symbols. The other objects, features and accompanied advantages of the present invention can be easily understood from the description of the embodiment of the present invention along with the drawings.

DESCRIPTION OF THE PREFERRED EMBODIMENTS

Below, a regulation speed display apparatus of a vehicle according to an embodiment of the present invention will be described with reference to the drawings.

<Configuration>

Figure 1:
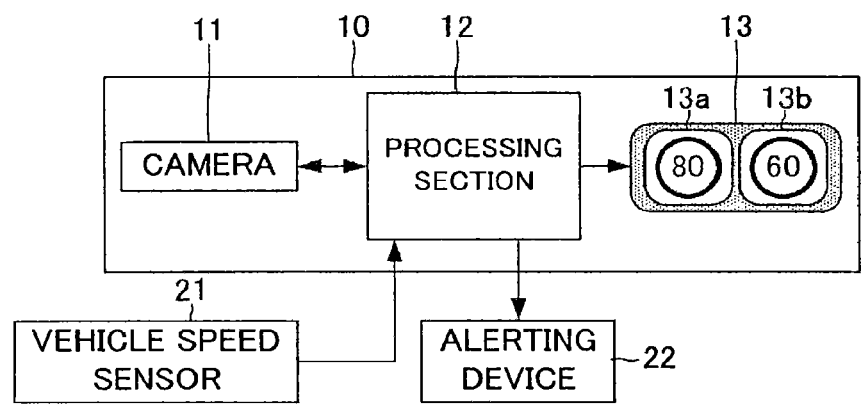
FIG. 1 shows a general configuration view of a regulation speed display apparatus of a vehicle according to an embodiment of the present invention.

FIG. 1 shows a general configuration of a regulation speed display apparatus 10 according to the embodiment of the present invention. Hereinafter, the regulation speed display apparatus 10 will be referred to as "the embodiment apparatus 10". The embodiment apparatus 10 is installed in a vehicle (i.e., an automobile or a car). The embodiment apparatus 10 includes a camera (i.e., an image acquisition device) 11, a processing section 12 and a display (i.e., a display device) 13.

Figure 2:
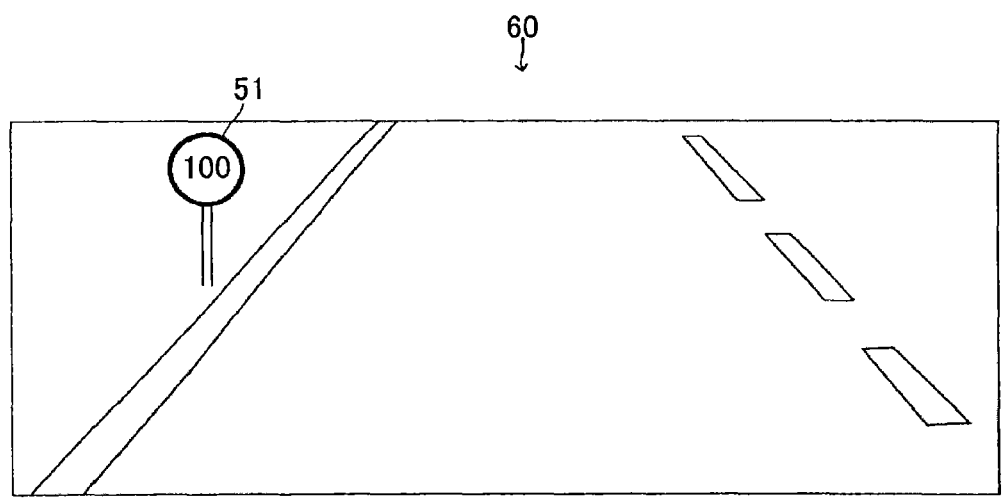
FIG. 2 shows a view for illustrating an image shot by a camera shown in FIG. 1.

The camera 11 is fixedly mounted on a stay of an inner rearview mirror (not shown) or the like provided at a front part of a vehicle body corresponding to a body of the vehicle. A light axis of the camera 11 corresponds to a longitudinal direction of the vehicle body (i.e., a vehicle travelling direction) under the condition that the camera 11 is mounted on the vehicle body. Therefore, as shown in FIG. 2, the camera 11 can shoot or take an image 60 (or an image data) of a landscape in the vehicle travelling direction or an image 60 (or image data) in front of the vehicle. The camera 11 shoots the landscape in front of the vehicle when the camera 11 receives a shooting command from the processing section 12. The camera 11 is, for example, a CCD camera.

Figure 3A:
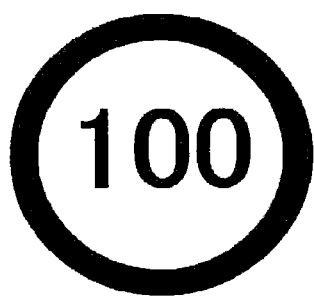
FIG. 3(A) shows a standard traffic sign.
Figure 3B:
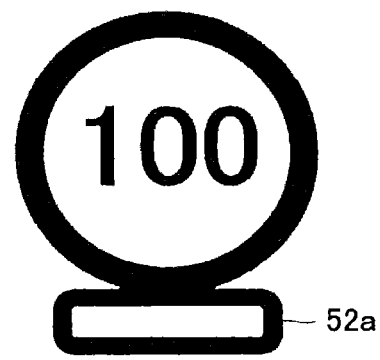
FIG. 3(B) shows a traffic sign with an auxiliary sign.

Traffic signs 51 and 52 and the like shown in FIG. 3 are set up by the side of a road, above the road and the like. Each of the traffic signs 51 and 52 indicates a regulation speed, in particular, a regulated maximum speed of a vehicle speed corresponding to a speed of the vehicle. The traffic sign 51 shown in FIG. 3(A) is a normal traffic sign without an auxiliary sign indicating a condition that a standard regulation speed indicated in the traffic sign 51 is applied to the vehicle. The traffic sign 52 shown in FIG. 3(B) is a traffic sign with an auxiliary sign 52a indicating a condition that an auxiliary regulation speed indicated in the traffic sign 52 is applied to the vehicle. This condition includes, for example, a condition relating to a weather, a condition relating to a type of the vehicle and a condition relating to the time zone.

The processing section 12 is an electronic control unit (ECU) including a known microcomputer including a RAM (a memory section), a ROM and a CPU. As described later in detail, the processing section 12 is configured or programmed to process the image 60 or the image data or a shot image or image signals acquired by the camera 11 to detect or recognize the traffic sign 51 and/or the traffic sign 52.

Further, as described later in detail, when the processing section 12 detects the traffic sign 51 in the shot image 60, the processing section 12 is configured or programmed to detect or recognize the regulation speed indicated in the detected traffic sign 51 as a standard regulation speed Vst_new and then, determine whether or not the detected standard regulation speed Vst_new should be displayed in the display 13. Further, as described later in detail, when the processing section 12 detects the traffic sign 52 in the shot image 60, the processing section 12 is configured or programmed to detect or recognize the regulation speed indicated in the detected traffic sign 52 as an auxiliary regulation speed Vsub_new and then, determine whether or not the detected auxiliary regulation speed Vsub_new should be displayed in the display 13.

The display 13 is provided at a position which a driver of the vehicle can see, for example, at a meter cluster panel. As shown in FIG. 1, the display 13 includes a first display part 13a for displaying the standard regulation speed Vst (i.e., a primary regulation speed) and a second display part 13b for displaying the auxiliary regulation speed Vsub. The display parts 13a and 13b display the standard and auxiliary regulation speeds Vst and Vsub according to display commands sent from the processing section 12, respectively.

A vehicle speed sensor 21 is configured to detect a vehicle speed SPD corresponding to a speed of the vehicle and output a signal which indicates the vehicle speed SPD. The signal output from the vehicle speed sensor 21 is input to the processing section 12. The processing section 12 acquires the vehicle speed SPD on the basis of the input signal.

An alerting device 22 is configured to generate an alert by a sound in response to a command sent from the processing section 12.

<Operation>

Next, an operation of the embodiment apparatus 10 configured as described above will be described. This operation is realized actually by the CPU of the processing section 12 of the embodiment apparatus 10 executing processes described below in accordance with a program or an instruction stored in the ROM.

In this embodiment, when an ignition switch is turned on, data of the standard and auxiliary regulation speeds Vst and Vsub are deleted from the RAM. In other words, data for indicating that the data is not effective is stored in a predetermined region of the RAM as data of each of the standard and auxiliary regulation speeds Vst and Vsub.

Figure 4:
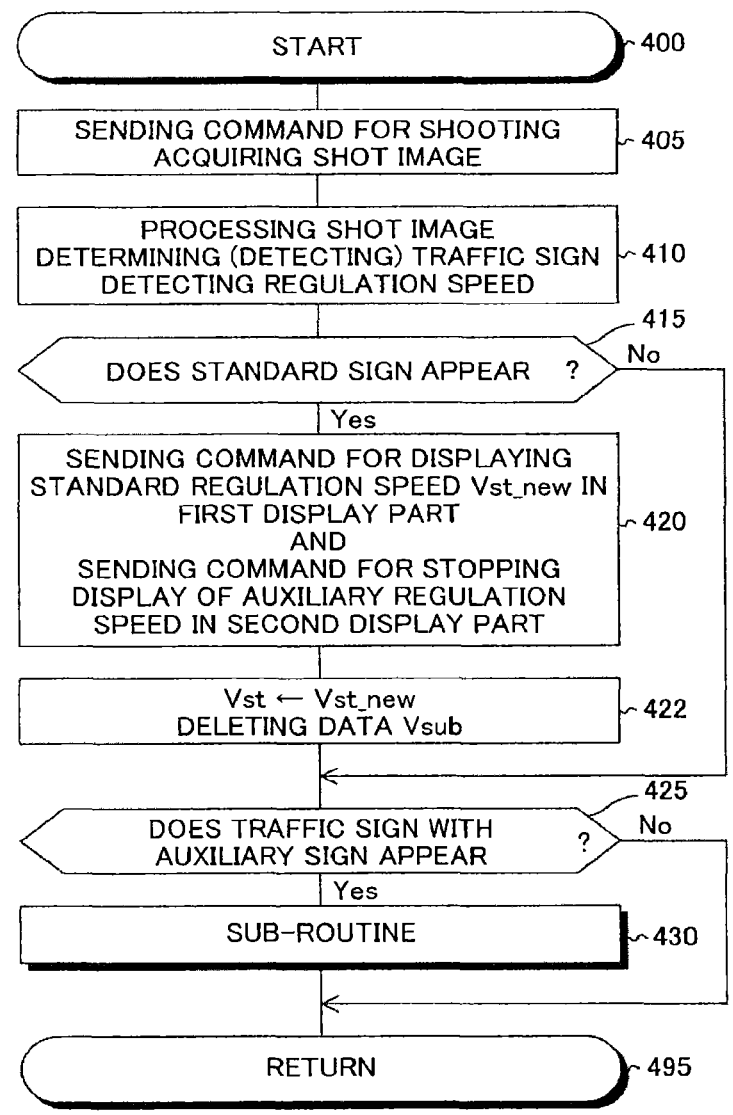
FIG. 4 shows a flowchart of a routine executed by a processing section (a CPU) shown in FIG. 1.

The CPU is configured or programmed to start an execution of a routine shown by a flowchart in FIG. 4 each time a predetermined time (for example, 0.1 second) elapses when the ignition switch is turned on. Therefore, at a predetermined timing, the CPU starts the execution of the routine from a step 400 of FIG. 4 and then, sequentially executes processes of steps 405 and 410 described below.

Step 405: The CPU sends a shooting command to the camera 11 to cause the camera 11 to shoot a landscape and acquires the image 60 shot by the camera 11 or the image data.

Step 410: The CPU processes the shot image 60 by a known method (for example, see JP 2010-205160 A) and then, determines whether or not the traffic sign 51 and/or the traffic sign 52 indicating the regulation speeds is/are included in the shot image 60 on the basis of the data of the processed shot image 60. When the CPU determines that the traffic sign 51 appears in the shot image 60, that is, when the CPU detects or recognizes the traffic sign 51 appearing in the shot image 60, the CPU detects the regulation speed indicated in the detected traffic sign 51 as the standard regulation speed Vst_new. Furthermore, when the CPU determines that the traffic sign 52 appears in the shot image 60, that is, when the CPU detects or recognizes the traffic sign 52 appearing in the shot image 60, the CPU detects the regulation speed indicated in the detected traffic sign 52 as the auxiliary regulation speed Vsub_new.

Next, the CPU proceeds with the process to a step 415 to determine whether or not the traffic sign 51 indicating the regulation speed appears in the shot image 60 on the basis of a result of the determination carried out at the step 410. When the traffic sign 51 appears in the shot image 60, the CPU determines "Yes" at the step 415 and then, sequentially executes processes of steps 420 and 422 described below.

Step 420: The CPU sends a display command for causing the first display part 13a to display the standard regulation speed Vst_new newly detected at the step 410 and sends a non-display command for causing the second display part 13b to terminate the display of the auxiliary regulation speed Vsub. As a result, the newly detected standard regulation speed Vst_new is displayed in the first display part 13a and the display of the auxiliary regulation speed Vsub in the second display part 13b is terminated.

Step 422: The CPU stores the standard regulation speed Vst_new newly detected at the step 410 as data Vst of the standard regulation speed indicated in the first display part 13a in the RAM and deletes data Vsub of the auxiliary regulation speed indicated in the second display part 13b. Then, the CPU proceeds with the process to a step 425.

On the other hand, when the traffic sign 51 does not appear in the shot image 60, the CPU determines "No" at the step 415 and then, proceeds with the process directly to the step 425.

When the CPU proceeds with the process to the step 425, the CPU determines whether or not the traffic sign 52 with the auxiliary sign 52a appears in the shot image 60 on the basis of a result of the determination carried out at the step 410. When the traffic sign 52 indicating the regulation speed appears in the shot image 60, the CPU determines "Yes" at the step 425 and then, proceeds with the process to a step 430 to execute a sub-routine shown by a flowchart in FIG. 5.

Figure 5:
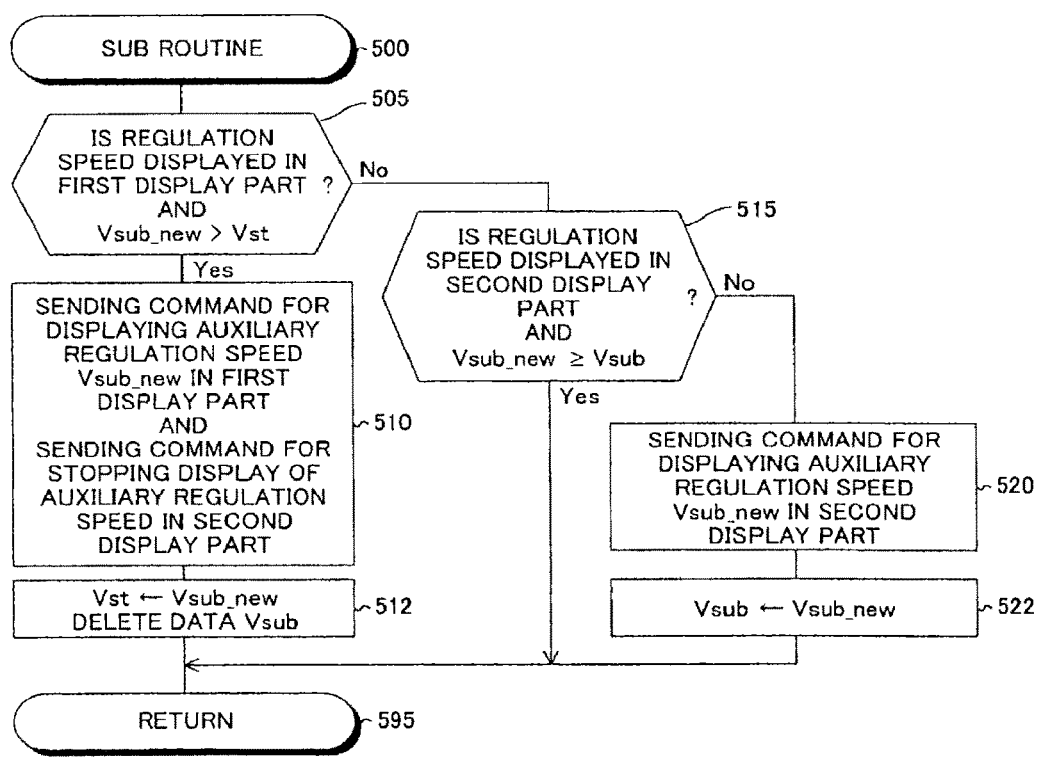
FIG. 5 shows a flowchart of a routine executed by the processing section (the CPU) shown in FIG. 1.

Therefore, when the CPU proceeds with the process to the step 430, the CPU starts an execution of the sub-routine from a step 500 of FIG. 5 and then, proceeds with the process to a step 505 to determine whether or not the standard regulation speed Vst is displayed in the first display part 13a and the auxiliary regulation speed Vsub_new newly detected at the step 410 of FIG. 4 is larger than the standard regulation speed Vst displayed in the first display part 13a.

When the standard regulation speed Vst is displayed in the first display part 13a and the newly detected auxiliary regulation speed Vsub_new is larger than the standard regulation speed Vst displayed in the first display part 13a, the CPU determines "Yes" at the step 505 and then, sequentially executes processes of steps 510 and 512 described below.

Step 510: The CPU sends a display command for causing the first display part 13a to display the auxiliary regulation speed Vsub_new newly detected at the step 410 of FIG. 4 and sends a non-display command for causing the second display part 13b to terminate the display of the auxiliary regulation speed Vsub. As a result, the newly detected auxiliary regulation speed Vsub_new is displayed in the first display part 13a and the display of the auxiliary regulation speed Vsub in the second display part 13b is terminated.

Step 512: The CPU stores the newly detected auxiliary regulation speed Vsub_new as the data Vst of the standard regulation speed displayed in the first display part 13a in the RAM and deletes the data Vsub of the auxiliary regulation speed displayed in the second display part 13b from the RAM. Then, the CPU proceeds with the process to the routine of FIG. 4 via a step 595.

On the other hand, when the standard regulation speed Vst is not displayed in the first display part 13a upon the execution of the process of the step 505 or the auxiliary regulation speed Vsub_new newly detected at the step 410 of FIG. 4 is smaller than the standard regulation speed Vst displayed in the first display part 13a upon the execution of the process of the step 505, the CPU determines "No" at the step 505 and then, proceeds with the process to a step 515.

When the CPU proceeds with the process to the step 515, the CPU determines whether or not the auxiliary regulation speed Vsub is displayed in the second display part 13b and the auxiliary regulation speed Vsub_new newly detected at the step 410 is equal to or larger than the auxiliary regulation speed Vsub displayed in the second display part 13b.

When the auxiliary regulation speed Vsub is not displayed in the second display part 13b or the auxiliary regulation speed Vsub_new newly detected at the step 410 of FIG. 4 is smaller than the auxiliary regulation speed Vsub displayed in the second display part 13b, the CPU determines "No" at the step 515 and then, sequentially executes processes of steps 520 and 522 described below.

Step 520: The CPU sends a display command for causing the second display part 13b to display the auxiliary regulation speed Vsub_new newly detected at the step 410 of FIG. 4. As a result, the newly detected auxiliary regulation speed Vsub_new is displayed in the second display part 13b.

Step 522: The CPU stores the auxiliary regulation speed Vsub_new newly detected at the step 410 of FIG. 4 as the data Vsub of the auxiliary regulation speed displayed in the second display part 13b in the RAM. Then, the CPU proceeds with the process to the routine of FIG. 4 via the step 595.

On the other hand, when the auxiliary regulation speed Vsub is displayed in the second display part 13b upon the execution of the process of the step 515 and the auxiliary regulation speed Vsub_new newly detected at the step 410 of FIG. 4 is equal to or larger than the auxiliary regulation speed Vsub displayed in the second display part 13b upon the execution of the process of the step 515, the CPU determines "Yes" at the step 515 and then, proceeds with the process to the routine of FIG. 4 via the step 595. In this case, the display of the auxiliary regulation speed Vsub in the second display part 13b is not changed and the present display in the second display part 13b is continued.

It should be noted that when the traffic sign 52 does not appear in the shot image 60, the CPU determines "No" at the step 425 of FIG. 4 and then, proceeds with the process directly to the step 495 to terminate the execution of this routine once. In this case the display of the auxiliary regulation speed Vsub in the second display part 13b is not changed and the present display in the second display part 13b is continued.

The operation of the embodiment apparatus 10 has been described. According to the embodiment apparatus 10, for example, when the vehicle 30 travels on a road shown in FIG. 6, the display of the regulation speed in the display 13 is carried out as follows.

Figure 6:
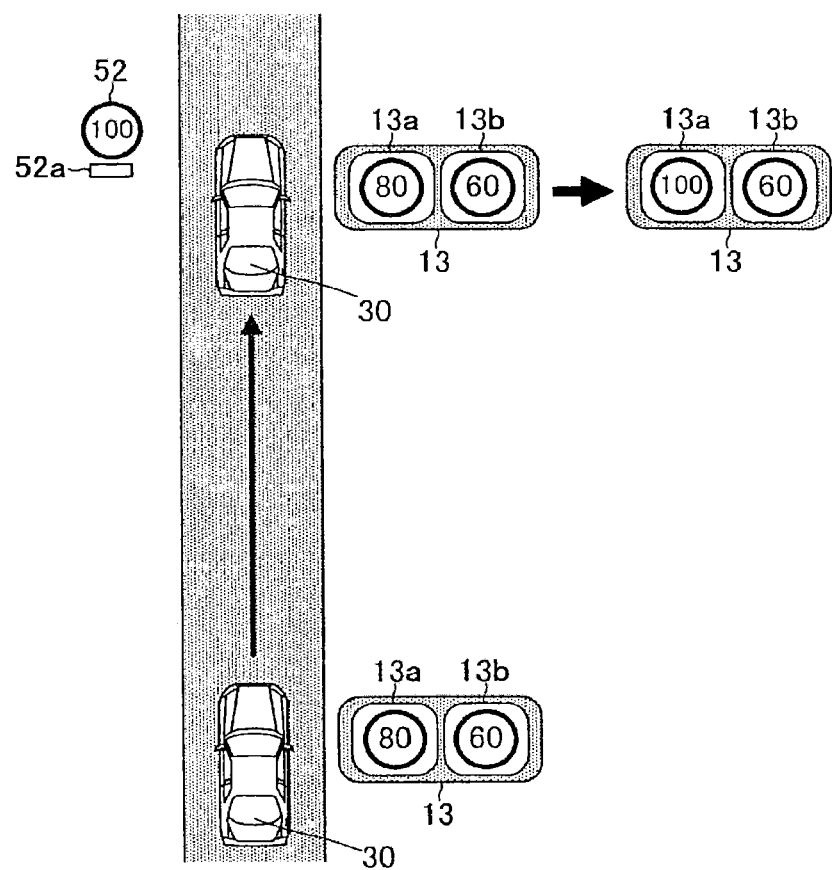
FIG. 6 shows a view used for describing a display of the regulation speed and the like carried out by the regulation speed display apparatus shown in FIG. 1.

In an example shown in FIG. 6, the traffic sign 52 indicating 100 km/h as the auxiliary regulation speed is set up at a left side of the road. It should be noted that when the vehicle 30 travels at a front side of the traffic sign 52, the first display part 13a displays 80 km/h as the standard regulation speed Vst and the second display part 13b displays 60 km/h as the auxiliary regulation speed Vsub.

When the vehicle 30 comes close to the traffic sign 52, the camera 11 of the vehicle 30 shoots a landscape including the traffic sign 52. At this time, the embodiment apparatus 10 recognizes or detects the traffic sign 52, determines that the traffic sign 52 corresponds to a traffic sign with an auxiliary sign 52a and detects the auxiliary regulation speed (=100 km/h) indicated in the traffic sign 52.

Then, since the newly detected auxiliary regulation speed Vsub_new (=100 km/h) is larger than the standard regulation speed Vst (=80 km/h) displayed in the first display part 13a, the embodiment apparatus 10 sends to the display 13, a command for causing the first display part 13a to display the newly detected auxiliary regulation speed Vsub_new (=100 km/h) when the vehicle 30 passes by the traffic sign 52.

In other words, the CPU determines "No" at the step 415 of FIG. 4, determines "Yes" at the step 425 of FIG. 4 and the step 505 of FIG. 5, respectively and then, executes the process of the step 510. As a result, the standard regulation speed Vst displayed in the first display part 13a is changed from 80 km/h to 100 km/h.

As described above, according to the embodiment apparatus 10, when the newly detected auxiliary regulation speed Vsub_new is equal to or larger than the standard regulation speed Vst displayed in the first display part 13a, the newly detected auxiliary regulation speed Vsub_new is displayed in the first display part 13a.

On the other hand, according to the embodiment apparatus 10, when the vehicle 30 travels on a road shown in FIG. 7, the display of the regulation speed in the display 13 is carried out as follows.

Figure 7:
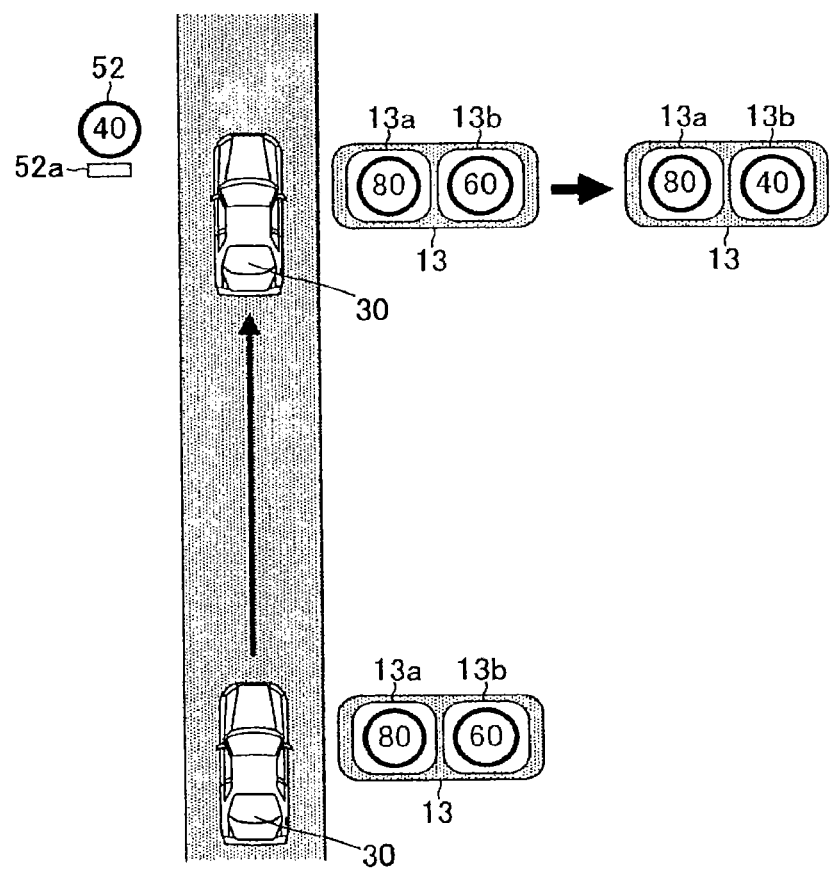
FIG. 7 shows a view used for describing a display of the regulation speed and the like carried out by the regulation speed display apparatus shown in FIG. 1.

In an example shown in FIG. 7, the traffic sign 52 indicating 40 km/h as the auxiliary regulation speed is set up at a left side of the road. It should be noted that when the vehicle 30 travels at a front side of the traffic sign 52, the first display part 13a displays 80 km/h as the standard regulation speed Vst and the second display part 13b displays 60 km/h as the auxiliary regulation speed Vsub.

When the vehicle 30 comes close to the traffic sign 52 with the auxiliary sign 52a, the camera 11 of the vehicle 30 shoots a landscape including the traffic sign 52. At this time, the embodiment apparatus 10 recognizes or detects the traffic sign 52, determines that the traffic sign 52 corresponds to a traffic sign with an auxiliary sign 52a and detects the auxiliary regulation speed (=40 km/h) indicated in the traffic sign 52.

Then, although the newly detected auxiliary regulation speed Vsub_new (=40 km/h) is equal to or smaller than the standard regulation speed Vst (=60 km/h) displayed in the first display part 13a, since the newly detected auxiliary regulation speed (=40 km/h) is smaller than the auxiliary regulation speed Vsub (=60 km/h) displayed in the second display part 13b, the embodiment apparatus 10 sends to the display 13, a command for causing the second display part 13b to display the newly detected auxiliary regulation speed Vsub_new (=40 km/h) when the vehicle 30 passes by the traffic sign 52.

In other words, the CPU determines "No" at the step 415 of FIG. 4, determines "Yes" at the step 425 of FIG. 4, determines "No" at the steps 505 and 515 of FIG. 5, respectively and then, executes the process of the step 520. As a result, the auxiliary regulation speed Vsub displayed in the second display part 13b is changed from 60 km/h to 40 km/h.

As described above, according to the embodiment apparatus 10, although the newly detected auxiliary regulation speed Vsub_new is equal to or smaller than the standard regulation speed Vst displayed in the first display part 13a and thus, the newly detected auxiliary regulation speed Vsub_new is not displayed in the first display part 13a, when the newly detected auxiliary regulation speed Vsub_new is smaller than the auxiliary regulation speed Vsub displayed in the second display part 13b, the newly detected auxiliary regulation speed Vsub_new is displayed in the second display part 13b.

The embodiment apparatus 10 may be configured to execute a sub-routine of the step 430 of FIG. 4 only when the embodiment apparatus 10 cannot recognize a content indicated in the auxiliary sign 52a of the traffic sign 52. In this case, the embodiment apparatus 10 executes a routine shown by a flowchart in FIG. 8.

Figure 8:
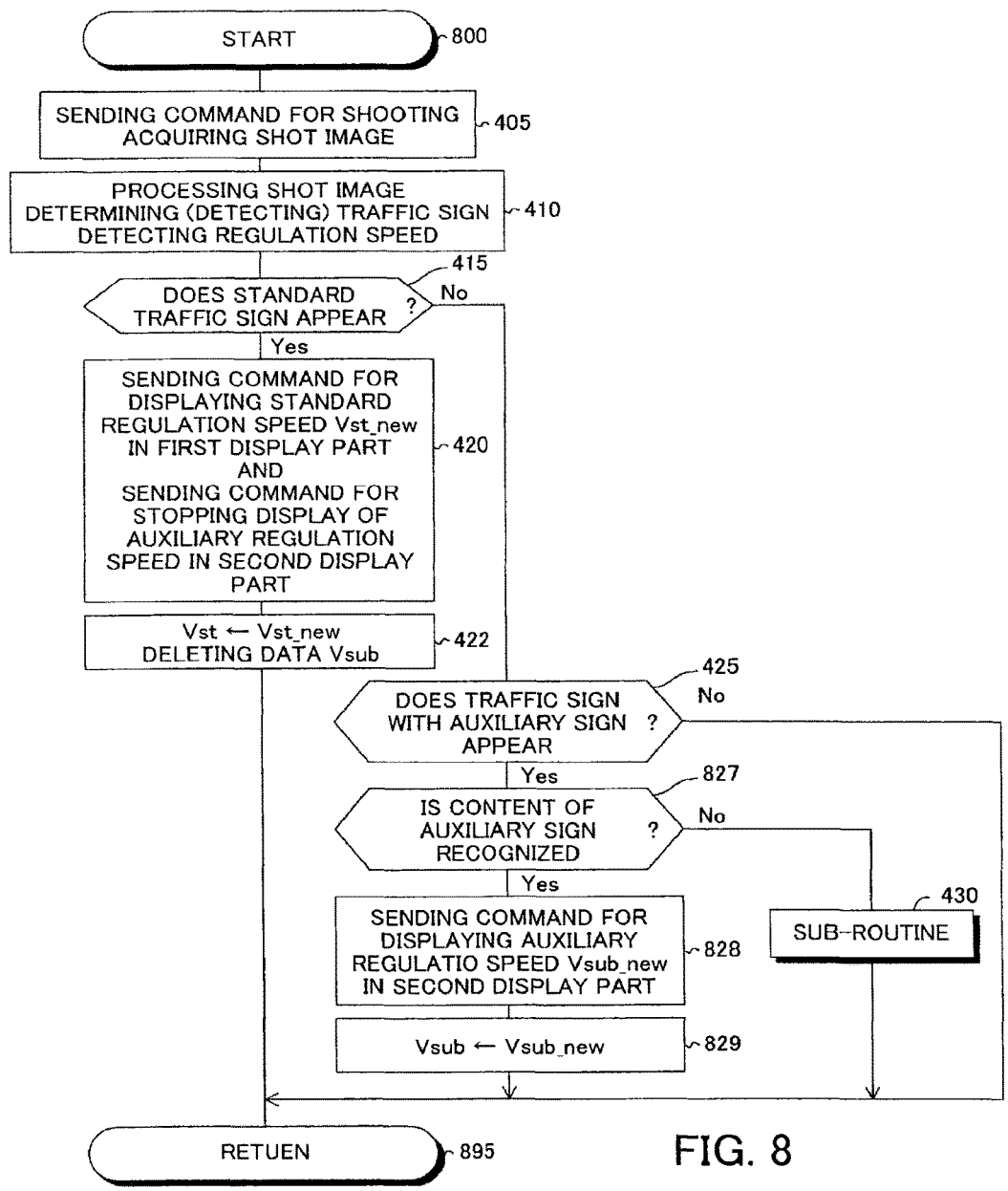
FIG. 8 shows a flowchart of a routine executed by the processing section (the CPU) shown in FIG. 1.

Processes of the routine shown in FIG. 8 are the same as the processes of the routine shown in FIG. 4 except that processes of steps 827 to 829 are added. Therefore, the descriptions of the processes of the steps other than the steps 827 to 829 will be omitted.

When the CPU of the embodiment apparatus 10 determines "Yes" at the step 425 of FIG. 8, the CPU proceeds with the process to a step 827. When the CPU proceeds with the process to the step 827, the CPU determines whether or not the content indicated in the auxiliary sign 52a of the traffic sign 52 appearing in the shot image 60 acquired at the step 405 is recognized or detected.

When the content indicated in the auxiliary sign 52a of the traffic sign 52 is not recognized or detected, the CPU determines "No" at the step 827 and then, proceeds with the process to the step 430 to execute the routine of FIG. 5 as described above.

On the other hand, when the content indicated in the auxiliary sign 52a of the traffic sign 52 is recognized or detected, the CPU determines "Yes" at the step 827 and then, sequentially executes processes of steps 828 and 829 described below.

Step 828: The CPU sends a display command for causing the second display part 13b to display the auxiliary regulation speed Vsub_new newly detected at the step 410. As a result, the newly detected auxiliary regulation speed Vsub_new is displayed in the second display part 13b.

Step 829: The CPU stores the auxiliary regulation speed Vsub_new newly detected at the step 410 as the data Vsub of the auxiliary regulation speed displayed in the second display part 13b in the RAM. Then, the CPU proceeds with the process to a step 895 to terminate the execution of this routine once.

Accordingly, the newly detected auxiliary regulation speed Vsub_new is displayed in the second display part 13b only when the content indicated in the auxiliary sign 52a of the traffic sign 52 is recognized.

Figure 9:
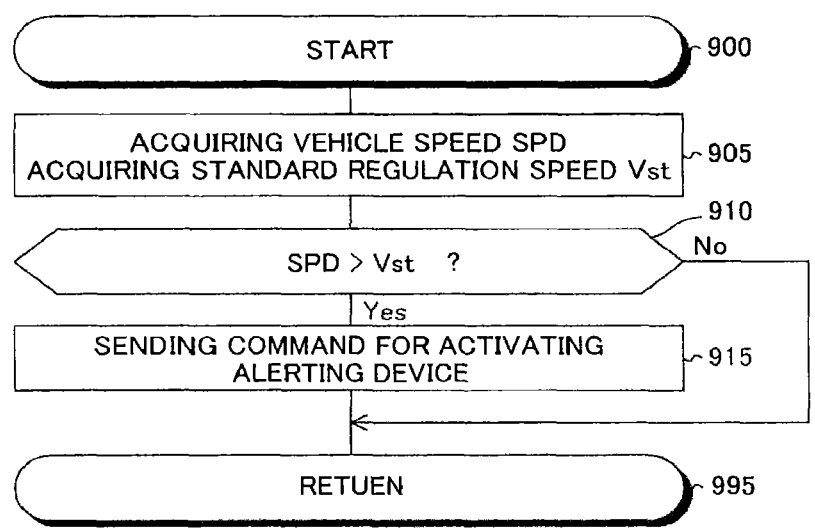
FIG. 9 shows a flowchart of a routine executed by the processing section (the CPU) shown in FIG. 1.

Further, when the ignition switch is turned on, the CPU of the processing section 12 is configured or programmed to start an execution of a routine shown by flowchart in FIG. 9 each time a predetermined time (for example, 0.1 second) elapses. Therefore, at a predetermined timing, the CPU starts an execution of the routine from a step 900 of FIG. 9 and then, proceeds with the process to a step 905 to acquire the vehicle speed SPD and the standard regulation speed Vst displayed in the first display part 13a. The vehicle speed SPD is acquired on the basis of a signal output from the vehicle speed sensor 21.

Then, the CPU proceeds with the process to a step 910 to determines whether or not the vehicle speed SPD is larger than the standard regulation speed Vst.

When the vehicle speed SPD is larger than the standard regulation speed Vst, the CPU determines "Yes" at the step 910 and then, proceeds with the process to a step 915 to send a command for causing the alerting device 22 to activate. Then, the CPU proceeds with the process to a step 995 to terminate the execution of this routine once.

On the other hand, when the vehicle speed SPD is equal to or smaller than the standard regulation speed Vst, the CPU determines "No" at the step 910 and then, proceeds with the process directly to the step 995 to terminate the execution of this routine once.

According to the above-described routine, when the vehicle speed SPD becomes larger than the standard regulation speed Vst displayed in the first display part 13a, an alerting sound is generated from the alerting device 22 for notifying that the vehicle speed SPD becomes larger than the standard regulation speed Vst.

It should be noted that the embodiment apparatus 10 causes the alerting device 22 to generate an alerting sound to notify the driver of the vehicle speed SPD becoming larger than the standard regulation speed Vst displayed in the first display part 13a when the vehicle speed SPD becomes larger than the standard regulation speed Vst displayed in the first display part 13a. Alternatively, the embodiment apparatus 10 may display in the display 13 that the vehicle speed SPD is larger than the standard regulation speed Vst to notify the driver of the vehicle speed SPD being larger than the standard regulation speed Vst. In other words, according to the present invention, alerting means including a generation of a sound and a display in the display 13 may notify the driver of the vehicle speed SPD being larger than the standard regulation speed Vst.

As described above, the regulation speed display apparatus 10 of the vehicle according to the embodiment of the present invention comprises a display device (the display) 13, an image acquisition device (the camera) 11 and the processing section 12.

The processing section 12 is configured or programmed:
to detect, on the basis of the data acquired by the image acquisition device 11, a regulation speed (i.e., the standard regulation speed) Vst_new indicated in a shot traffic sign corresponding to the traffic sign 51 (i.e., the standard traffic sign 51) appearing in the landscape shot by the image acquisition device 11 and/or a regulation speed (i.e., auxiliary regulation speed) Vsub_new indicated in a shot traffic sign corresponding to the traffic sign 52 (i.e., the traffic sign 52 with the auxiliary sign 52a) appearing in the landscape shot by the image acquisition device 11; and
to cause the display 13 to display the newly detected regulation speed Vst_new or Vsub_new as the standard regulation speed Vst in accordance with a predetermined condition.

Further, the processing section 12 determines whether or not the shot traffic sign is a traffic sign 52 with an auxiliary sign 52a (see the steps 405, 410 and 425 of FIG. 4).

When the regulation speed is newly detected and the processing section 12 determines that the shot traffic sign indicating the newly detected regulation speed is not the traffic sign 52 with the auxiliary sign 52a, that is, the processing section 12 determines that the shot traffic sign indicating the newly detected regulation speed is the traffic sign 51 (see the determination of "Yes" at the step 415 of FIG. 4), the processing section 12 causes the display 13 to display the newly detected regulation speed (i.e., the standard regulation speed) Vst_new as the standard regulation speed Vst (see the step 420 of FIG. 4).

On the other hand, when the regulation speed is newly detected and the processing section 12 determines that the shot traffic sign indicating the newly detected regulation speed is the traffic sign 52 (see the determination of "Yes" at the step 425 of FIG. 4) and the newly detected regulation speed (i.e., the auxiliary regulation speed) Vsub_new is larger than the regulation speed displayed as the standard regulation speed Vst in the display 13 (see the determination of "Yes" at the step 505 of FIG. 5), the processing section 12 causes the display 13 to display the newly detected regulation speed Vsub_new as the standard regulation speed Vst (see the step 510 of FIG. 5).

Further, when the regulation speed is newly detected and the processing section 12 determines that the shot traffic sign indicating the newly detected regulation speed is the traffic sign 52 (see the determination of "Yes" at the step 425 of FIG. 4) and the newly detected regulation speed (i.e., the auxiliary regulation speed) Vsub_new is equal to or smaller than the regulation speed displayed as the standard regulation speed Vst in the display 13 (see the determination of "Yes" at the step 515 of FIG. 5), the processing section 12 causes the display 13 to maintain the present display of the regulation speed as the standard regulation speed Vst without causing the display 13 to display the newly detected regulation speed Vsub_new as the standard regulation speed Vst.

Further, the display device 13 is configured to display an auxiliary regulation speed Vsub in addition to the standard regulation speed Vst.

In this regard, when a regulation speed is newly detected, the processing section 12 determines that the shot traffic sign indicating the newly detected regulation speed is a traffic sign 52 with an auxiliary sign 52a (see the determination of "Yes" at the step 425 of FIG. 4) and the newly detected regulation speed Vsub_new is equal to or smaller than the regulation speed displayed as the auxiliary regulation speed Vsub (see the determination of "No" at the step 515 of FIG. 5), the processing section 12 causes the display device 13 to display the newly detected regulation speed Vsub_new as the auxiliary regulation speed Vsub (see the step 520 of FIG. 5).

Alternatively, when a regulation speed is newly detected, the processing section 12 determines that the shot traffic sign indicating the newly detected regulation speed is the traffic sign 52 with the auxiliary sign 52a (see the determination of "Yes" at the step 425 of FIG. 8) and the content indicated in the auxiliary sign 52a of the traffic sign 52 is recognized (see the determination of "Yes" at the step 827 of FIG. 8), the processing section 12 causes the display device 13 to display the newly detected regulation speed Vsub_new independently of whether or not the newly detected regulation speed Vsub_new is equal to or smaller than the regulation speed displayed as the auxiliary regulation speed Vsub in the display device 13.

On the other hand, when a regulation speed is newly detected, the processing section 12 determines that the shot traffic sign indicating the newly detected regulation speed is a traffic sign 52 with an auxiliary sign 52a (see the determination of "Yes" at the step 425 of FIG. 8), the content indicated in the auxiliary sign 52a of the traffic sign 52 is not recognized (see the determination of "No" at the step 827 of FIG. 8) and the newly detected regulation speed Vsub_new is equal to or smaller than the regulation speed displayed as the auxiliary regulation speed Vsub in the display device 13 (see the determination of "No" at the step 515 of FIG. 5), the processing section 12 causes the display device 13 to display the newly detected regulation speed Vsub_new as the auxiliary regulation speed Vsub (see the step 520 of FIG. 5).

In addition, when a regulation speed is newly detected, the processing section 12 determines that the shot traffic sign indicating the newly detected regulation speed is the traffic sign 52 with the auxiliary sign 52a (see the determination of "Yes" at the step 425 of FIG. 4) and the display device 13 does not display the regulation speed as the auxiliary regulation speed Vsub (see the determination of "No" at the step 515 of FIG. 5), the processing section 12 causes the display device 13 to display the newly detected regulation speed Vsub_new as the auxiliary regulation speed Vsub (see the step 520 of FIG. 5).

Therefore, the regulation speed display apparatus 10 according to the embodiment of the present invention is likely to display a regulation speed to be essentially applied to the vehicle. Alternatively, the regulation speed display apparatus 10 is likely to display a speed near the regulation speed to be essentially applied to the vehicle though the displayed speed is smaller than the regulation speed to be essentially applied to the vehicle.

It should be noted that that the present invention is not limited to the above-described embodiment and various modifications can be employed within a scope of the present invention. For example, the display device 13 may have only the first display part 13*a*. In this case, the process of each of the routines described above for sending a command to the second display part 13*b* is omitted.

What is claimed is:

1. A regulation speed display apparatus of a vehicle, comprising:
    a display device that displays a regulation speed to be applied to the vehicle;
    a camera that shoots a landscape in front of the vehicle to acquire image data of the landscape in front of the vehicle; and
    processing circuitry configured to detect a regulation speed indicated in a traffic sign appearing in the shot landscape on the basis of the image data and causing the display device to display the detected regulation speed as a standard regulation speed,
    wherein the processing circuitry is configured:
    to determine whether or not a traffic sign appearing in the shot landscape and indicating a regulation speed newly detected by the processing section circuitry is a traffic sign with an auxiliary sign on the basis of the image data;
    to cause the display device to display the newly detected regulation speed as the standard regulation speed when the processing circuitry determines that the traffic sign appearing in the shot landscape and indicating the newly detected regulation speed is not the traffic sign with the auxiliary sign;
    to cause the display device to display the newly detected regulation speed as the standard regulation speed when the processing circuitry determines that the traffic sign appearing in the shot landscape and indicating the newly detected regulation speed is the traffic sign with the auxiliary sign and the newly detected regulation speed is larger than a regulation speed already displayed as the standard regulation speed in the display device; and
    to cause the display device to maintain the display of the regulation speed already displayed as the standard regulation speed in the display device without causing the display device to display the newly detected regulation speed as the standard regulation speed when the processing circuitry determines that the traffic sign appearing in the shot landscape and indicating the newly detected regulation speed is the traffic sign with the auxiliary sign and the newly detected regulation speed is equal to or smaller than the regulation speed already displayed as the standard regulation speed in the display device;
    wherein
    the display device is configured to display an auxiliary regulation speed in addition to the standard regulation speed, and
    the processing circuitry is configured:
    to cause the display device to display the newly detected regulation speed as the auxiliary regulation speed when the processing circuitry determines that the traffic sign appearing in the shot landscape and indicating the newly detected regulation speed is the traffic sign with the auxiliary sign and the newly detected regulation speed is equal to or smaller than the regulation speed already displayed as the auxiliary regulation speed in the display device, and
    to cause the display device to display the newly detected regulation speed as the auxiliary regulation speed when the processing circuitry determines that the traffic sign appearing in the shot landscape and indicating the newly detected regulation speed is the traffic sign with the auxiliary sign and the display device has displayed no regulation speed as the auxiliary regulation speed.

2. The regulation speed display apparatus according to claim 1, wherein the display device is configured to display the auxiliary regulation speed in addition to the standard regulation speed,
    the processing circuitry is configured:
    to cause the display device to display the newly detected regulation speed as the auxiliary regulation speed when the processing circuitry determines that the traffic sign appearing in the shot landscape and indicating the newly detected regulation speed is the traffic sign with the auxiliary sign and the processing circuitry recognizes a content indicated in the auxiliary sign;
    to cause the display device to display the newly detected regulation speed as the auxiliary regulation speed when the processing circuitry determines that the traffic sign appearing in the shot landscape and indicating the newly detected regulation speed is the traffic sign with the auxiliary sign, the processing circuitry does not recognize the content indicated in the auxiliary sign and the newly detected regulation speed is equal to or smaller than the regulation speed already displayed as the auxiliary regulation speed in the display device.

3. A regulation speed display apparatus of a vehicle, comprising:
    a display device for displaying a regulation speed to be applied to the vehicle;
    a camera that shoots a landscape in front of the vehicle to acquire image data of the landscape in front of the vehicle; and
    processing circuitry configured to detect a regulation speed indicated in a traffic sign appearing in the shot landscape on the basis of the image data and causing the display device to display the detected regulation speed as a standard regulation speed,
    wherein the processing circuitry is configured:
    to determine whether or not a traffic sign appearing in the shot landscape and indicating a regulation speed newly detected by the processing circuitry is a traffic sign with an auxiliary sign on the basis of the image data;
    to cause the display device to display the newly detected regulation speed as the standard regulation speed when the processing circuitry determines that the traffic sign appearing in the shot landscape and indicating the newly detected regulation speed is not the traffic sign with the auxiliary sign;
    to cause the display device to display the newly detected regulation speed as the standard regulation speed when the processing circuitry determines that the traffic sign appearing in the shot landscape and indicating the newly detected regulation speed is the traffic sign with the auxiliary sign and the newly detected regulation speed is larger than a regulation speed already displayed as the standard regulation speed in the display device; and
    to cause the display device to maintain the display of the regulation speed already displayed as the standard regulation speed in the display device without causing the display device to display the newly detected regulation speed as the standard regulation speed when the processing circuitry determines that the traffic sign appearing in the shot landscape and indicating the newly detected regulation speed is the traffic sign with the auxiliary sign and the newly detected regulation speed is equal to or smaller than the regulation speed already displayed as the standard regulation speed in the display device;

wherein the display device is configured to display an auxiliary regulation speed in addition to the standard regulation speed, and the processing circuitry is configured:

to cause the display device to display the newly detected regulation speed as the auxiliary regulation speed when the processing circuitry determines that the traffic sign appearing in the shot landscape and indicating the newly detected regulation speed is the traffic sign with the auxiliary sign and the processing circuitry recognizes a content indicated in the auxiliary sign, and to cause the display device to display the newly detected regulation speed as the auxiliary regulation speed when the processing circuitry determines that the traffic sign appearing in the shot landscape and indicating the newly detected regulation speed is the traffic sign with the auxiliary sign, the processing circuitry does not recognize the content indicated in the auxiliary sign and the newly detected regulation speed is equal to or smaller than the regulation speed already displayed as the auxiliary regulation speed in the display device.

4. The regulation speed display apparatus according to claim 3, wherein the processing circuitry is configured to cause the display device to display the newly detected regulation speed as the auxiliary regulation speed when the processing circuitry determines that the traffic sign appearing in the shot landscape and indicating the newly detected regulation speed is the traffic sign with the auxiliary sign and the display device has displayed no regulation speed as the auxiliary regulation speed.

* * * * *